(12) United States Patent
Bredt et al.

(10) Patent No.: US 7,795,349 B2
(45) Date of Patent: Sep. 14, 2010

(54) MATERIAL SYSTEMS AND METHODS OF THREE-DIMENSIONAL PRINTING

(75) Inventors: James F. Bredt, Watertown, MA (US); Timothy Anderson, Cambridge, MA (US); David B. Russell, Burlington, MA (US); Sarah L. Clark, Somerville, MA (US); Matthew J. DiCologero, Medford, MA (US)

(73) Assignee: Z Corporation, Burlington, MA (US)

( * ) Notice: Subject to any disclaimer, the term of this patent is extended or adjusted under 35 U.S.C. 154(b) by 1068 days.

(21) Appl. No.: 11/439,805

(22) Filed: May 24, 2006

(65) Prior Publication Data

US 2006/0208388 A1 Sep. 21, 2006

Related U.S. Application Data

(62) Division of application No. 09/706,350, filed on Nov. 3, 2000, now abandoned.

(60) Provisional application No. 60/164,000, filed on Nov. 5, 1999.

(51) Int. Cl.
*C08K 13/02* (2006.01)
*B29C 67/24* (2006.01)

(52) U.S. Cl. .................... 525/193; 156/284; 156/305

(58) Field of Classification Search ............. 525/193, 525/385, 365; 156/284, 305
See application file for complete search history.

(56) References Cited

U.S. PATENT DOCUMENTS

| | | |
|---|---|---|
| 2,522,548 A | 9/1950 | Streicher |
| 2,662,024 A | 12/1953 | Riddell et al. |
| 3,297,601 A | 1/1967 | Maynard et al. |
| 3,303,147 A | 2/1967 | Elden |
| 3,309,328 A | 3/1967 | Carroll et al. |
| 3,476,190 A | 11/1969 | Jenny et al. |
| 3,525,632 A | 8/1970 | Enoch |
| 3,642,683 A * | 2/1972 | Fry ........................... 524/311 |
| 3,821,006 A | 6/1974 | Schwartz |
| 3,835,074 A | 9/1974 | Desmarais |
| 3,852,083 A | 12/1974 | Yang |
| 3,870,538 A | 3/1975 | Burkard et al. |
| 3,890,305 A | 6/1975 | Weber et al. |
| 3,926,870 A | 12/1975 | Keegan et al. |

(Continued)

FOREIGN PATENT DOCUMENTS

CN 1810492 8/2006

(Continued)

OTHER PUBLICATIONS

International Preliminary Report on Patentability for Intl. Application No. PCT/US2004/027549 (Dec. 6, 2007).

(Continued)

*Primary Examiner*—Satya B Sastri
(74) *Attorney, Agent, or Firm*—Goodwin Procter LLP

(57) ABSTRACT

The present invention is directed to three-dimensional printing material systems and method, and an article made therefrom. The method of the present invention includes building cross-sectional portions of a three-dimensional article, and assembling the individual cross-sectional areas in a layer-wise fashion to form a final article. The individual cross-sectional areas are built by using an ink-jet printhead to deliver a fluid to a particulate material that includes particulate material.

3 Claims, 2 Drawing Sheets

U.S. PATENT DOCUMENTS

| | | | |
|---|---|---|---|
| 3,930,872 A | 1/1976 | Toeniskoetter et al. |
| 3,932,923 A | 1/1976 | DiMatteo |
| 4,041,476 A | 8/1977 | Swainson |
| 4,042,408 A | 8/1977 | Murray et al. |
| 4,078,229 A | 3/1978 | Swanson et al. |
| 4,247,508 A | 1/1981 | Householder |
| 4,288,861 A | 9/1981 | Swainson et al. |
| 4,310,996 A | 1/1982 | Mulvey et al. |
| 4,327,156 A | 4/1982 | Dillon et al. |
| 4,369,025 A | 1/1983 | Von der Weid |
| 4,443,392 A | 4/1984 | Becker et al. |
| 4,444,594 A | 4/1984 | Paddison et al. |
| 4,476,190 A | 10/1984 | Clarke et al. |
| 4,575,330 A | 3/1986 | Hull |
| 4,613,627 A | 9/1986 | Sherman et al. |
| 4,618,390 A | 10/1986 | Powell |
| 4,649,077 A | 3/1987 | Lauchenauer et al. |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Bearman et al. |
| 4,940,412 A | 7/1990 | Blumenthal et al. |
| 4,942,001 A | 7/1990 | Murphy et al. |
| 4,942,003 A | 7/1990 | Bold |
| 4,942,060 A | 7/1990 | Grossa et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur et al. |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,691 A | 12/1993 | Hull et al. |
| 5,275,916 A | 1/1994 | Kato et al. |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |

| | | | | | |
|---|---|---|---|---|---|
| 5,306,447 A | 4/1994 | Marcus et al. | 5,534,104 A | 7/1996 | Langer et al. |
| 5,316,580 A | 5/1994 | Deckard | 5,536,467 A | 7/1996 | Reichle et al. |
| 5,328,539 A | 7/1994 | Sato | 5,545,367 A | 8/1996 | Bae et al. |
| 5,338,611 A | 8/1994 | Lause et al. | 5,554,336 A | 9/1996 | Hull |
| 5,340,433 A | 8/1994 | Crump | 5,555,176 A | 9/1996 | Menhennett et al. |
| 5,340,656 A | 8/1994 | Sachs et al. | 5,555,481 A | 9/1996 | Rock et al. |
| 5,342,566 A | 8/1994 | Schafer et al. | 5,556,590 A | 9/1996 | Hull |
| 5,342,919 A | 8/1994 | Dickens, Jr. et al. | 5,569,349 A | 10/1996 | Almquist et al. |
| 5,344,298 A | 9/1994 | Hull | 5,569,431 A | 10/1996 | Hull |
| 5,345,391 A | 9/1994 | Hull et al. | 5,571,471 A | 11/1996 | Hull |
| 5,345,414 A | 9/1994 | Nakamura et al. | 5,572,431 A | 11/1996 | Brown et al. |
| 5,348,693 A | 9/1994 | Taylor et al. | 5,573,721 A | 11/1996 | Gillette |
| 5,352,310 A | 10/1994 | Natter | 5,573,722 A | 11/1996 | Hull |
| 5,352,405 A | 10/1994 | Beaman et al. | 5,573,889 A | 11/1996 | Hofmann et al. |
| 5,355,318 A | 10/1994 | Dionnet et al. | 5,582,876 A | 12/1996 | Langer et al. |
| 5,358,673 A | 10/1994 | Heller et al. | 5,587,913 A | 12/1996 | Abrams et al. |
| 5,364,889 A | 11/1994 | Quinn et al. | 5,591,563 A | 1/1997 | Suzuki et al. |
| 5,365,996 A | 11/1994 | Crook | 5,593,531 A | 1/1997 | Penn |
| 5,370,692 A | 12/1994 | Fink et al. | 5,594,652 A | 1/1997 | Penn et al. |
| 5,376,320 A | 12/1994 | Tiefenbacher et al. | 5,595,597 A | 1/1997 | Fogel et al. |
| 5,382,289 A | 1/1995 | Bambauer et al. | 5,595,703 A | 1/1997 | Swaelens et al. |
| 5,382,308 A | 1/1995 | Bourell et al. | 5,596,504 A | 1/1997 | Tata et al. |
| 5,385,772 A | 1/1995 | Slovinsky et al. | 5,597,520 A | 1/1997 | Smalley et al. |
| 5,386,500 A | 1/1995 | Pomerantz et al. | 5,597,589 A | 1/1997 | Deckard |
| 5,387,380 A | 2/1995 | Cima et al. | 5,598,340 A | 1/1997 | Medard et al. |
| 5,391,072 A | 2/1995 | Lawton et al. | 5,599,651 A | 2/1997 | Steinmann et al. |
| 5,391,460 A | 2/1995 | Dougherty et al. | 5,603,797 A | 2/1997 | Thomas et al. |
| 5,393,613 A | 2/1995 | MacKay | 5,605,941 A | 2/1997 | Steinmann et al. |
| 5,402,351 A | 3/1995 | Batchelder et al. | 5,608,814 A | 3/1997 | Gilmore et al. |
| 5,415,820 A | 5/1995 | Furuta et al. | 5,609,812 A | 3/1997 | Childers et al. |
| 5,418,112 A | 5/1995 | Mirle et al. | 5,609,813 A | 3/1997 | Allison et al. |
| 5,426,722 A | 6/1995 | Batchelder | 5,610,824 A | 3/1997 | Vinson et al. |
| 5,429,788 A | 7/1995 | Ribble et al. | 5,611,883 A | 3/1997 | Tompkins et al. |
| 5,429,908 A | 7/1995 | Hokuf et al. | 5,614,075 A | 3/1997 | Andre, Sr. |
| 5,430,666 A | 7/1995 | DeAngelis et al. | 5,616,293 A | 4/1997 | Ashtiani-Zarandi et al. |
| 5,432,045 A | 7/1995 | Narukawa et al. | 5,616,294 A | 4/1997 | Deckard |
| 5,433,280 A | 7/1995 | Smith | 5,622,577 A | 4/1997 | O'Connor |
| 5,435,902 A | 7/1995 | Andre, Sr. | 5,622,811 A | 4/1997 | Ogue et al. |
| 5,437,964 A | 8/1995 | Lapin et al. | 5,626,919 A | 5/1997 | Chapman et al. |
| 5,439,622 A | 8/1995 | Pennisi et al. | 5,630,981 A | 5/1997 | Hull |
| 5,447,822 A | 9/1995 | Hull et al. | 5,632,848 A | 5/1997 | Richards et al. |
| 5,450,205 A | 9/1995 | Sawin et al. | 5,633,021 A | 5/1997 | Brown et al. |
| 5,458,825 A | 10/1995 | Grolman et al. | 5,637,169 A | 6/1997 | Hull et al. |
| 5,460,758 A | 10/1995 | Langer et al. | 5,637,175 A | 6/1997 | Feygin et al. |
| 5,461,088 A | 10/1995 | Wolf et al. | 5,639,070 A | 6/1997 | Deckard |
| 5,468,886 A | 11/1995 | Steinmann et al. | 5,639,402 A | 6/1997 | Barlow et al. |
| 5,470,689 A | 11/1995 | Wolf et al. | 5,639,413 A | 6/1997 | Crivello |
| 5,474,719 A | 12/1995 | Fan et al. | 5,640,667 A | 6/1997 | Freitag et al. |
| 5,482,659 A | 1/1996 | Sauerhoefer | 5,641,448 A | 6/1997 | Yeung et al. |
| 5,490,882 A | 2/1996 | Sachs et al. | 5,645,973 A | 7/1997 | Hofmann et al. |
| 5,490,962 A | 2/1996 | Cima et al. | 5,648,450 A | 7/1997 | Dickens, Jr. et al. |
| 5,491,643 A | 2/1996 | Batchelder | 5,649,277 A | 7/1997 | Greul et al. |
| 5,494,618 A | 2/1996 | Sitzmann et al. | 5,650,260 A | 7/1997 | Onishi et al. |
| 5,495,029 A | 2/1996 | Steinmann et al. | 5,651,934 A | 7/1997 | Almquist et al. |
| 5,495,328 A | 2/1996 | Spence et al. | 5,653,925 A | 8/1997 | Batchelder |
| 5,498,782 A | 3/1996 | Rex | 5,656,230 A | 8/1997 | Khoshevis |
| 5,500,069 A | 3/1996 | Ogue et al. | 5,658,412 A | 8/1997 | Retallick et al. |
| 5,501,824 A | 3/1996 | Almquist et al. | 5,658,712 A | 8/1997 | Steinmann et al. |
| 5,503,785 A | 4/1996 | Crump et al. | 5,659,478 A | 8/1997 | Pennisi et al. |
| 5,503,793 A | 4/1996 | Uchinono et al. | 5,660,621 A | 8/1997 | Bredt |
| 5,506,046 A | 4/1996 | Andersen et al. | 5,660,900 A | 8/1997 | Andersen et al. |
| 5,506,087 A | 4/1996 | Lapin et al. | 5,663,883 A | 9/1997 | Thomas et al. |
| 5,506,607 A | 4/1996 | Sanders, Jr. et al. | 5,665,401 A | 9/1997 | Serbin et al. |
| 5,507,336 A | 4/1996 | Tobin | 5,667,820 A | 9/1997 | Heller et al. |
| 5,510,226 A | 4/1996 | Lapin et al. | 5,672,312 A | 9/1997 | Almquist et al. |
| 5,512,162 A | 4/1996 | Sachs et al. | 5,674,921 A | 10/1997 | Regula et al. |
| 5,514,232 A | 5/1996 | Burns | 5,676,904 A | 10/1997 | Almquist et al. |
| 5,514,378 A | 5/1996 | Mikos et al. | 5,677,107 A | 10/1997 | Neckers |
| 5,518,680 A | 5/1996 | Cima et al. | 5,684,713 A | 11/1997 | Asada et al. |
| 5,519,816 A | 5/1996 | Pomerantz et al. | 5,688,464 A | 11/1997 | Jacobs et al. |
| 5,525,051 A | 6/1996 | Takano et al. | 5,693,144 A | 12/1997 | Jacobs et al. |
| 5,527,877 A | 6/1996 | Dickens, Jr. et al. | 5,695,707 A | 12/1997 | Almquist et al. |
| 5,534,059 A | 7/1996 | Immordino, Jr. | 5,697,043 A | 12/1997 | Baskaran et al. |

| | | | | | | |
|---|---|---|---|---|---|---|
| 5,698,485 | A | 12/1997 | Bruck et al. | 7,300,613 B2 | 11/2007 | Sano et al. |
| 5,700,406 | A | 12/1997 | Menhennett et al. | 7,332,537 B2 | 2/2008 | Bredt et al. |
| 5,703,138 | A | 12/1997 | Cantor et al. | 2001/0050031 A1 | 12/2001 | Bredt et al. |
| 5,705,116 | A | 1/1998 | Sitzmann et al. | 2002/0016387 A1 | 2/2002 | Shen |
| 5,705,117 | A | 1/1998 | O'Connor et al. | 2002/0026982 A1 | 3/2002 | Bredt et al. |
| 5,705,316 | A | 1/1998 | Steinmann et al. | 2002/0106412 A1 | 8/2002 | Rowe et al. |
| 5,707,578 | A | 1/1998 | Johnson et al. | 2003/0054218 A1 | 3/2003 | Hampden-Smith et al. |
| 5,707,780 | A | 1/1998 | Lawton et al. | 2003/0090034 A1 | 5/2003 | Mulhaupt et al. |
| 5,711,911 | A | 1/1998 | Hull | 2003/0143268 A1 | 7/2003 | Pryce Lewis et al. |
| 5,713,410 | A | 2/1998 | LaSalle et al. | 2003/0173695 A1 | 9/2003 | Monkhouse et al. |
| 5,717,599 | A | 2/1998 | Menhennett et al. | 2004/0038009 A1 | 2/2004 | Leyden et al. |
| 5,718,279 | A | 2/1998 | Satoh et al. | 2004/0056378 A1 | 3/2004 | Bredt et al. |
| 5,718,757 | A | 2/1998 | Guillou et al. | 2004/0062814 A1 | 4/2004 | Rowe et al. |
| 5,727,138 | A | 3/1998 | Harada et al. | 2004/0166187 A1 | 8/2004 | Fong |
| 5,728,345 | A | 3/1998 | Hlavaty et al. | 2004/0173946 A1 | 9/2004 | Pfeifer et al. |
| 5,730,817 | A | 3/1998 | Feygin et al. | 2004/0232583 A1 | 11/2004 | Monsheimer et al. |
| 5,730,925 | A | 3/1998 | Mattes et al. | 2005/0001356 A1 | 1/2005 | Tochimoto et al. |
| 5,731,388 | A | 3/1998 | Suzuki et al. | 2005/0003189 A1 | 1/2005 | Bredt et al. |
| 5,733,497 | A | 3/1998 | McAlea et al. | 2005/0017394 A1 | 1/2005 | Hochsmann et al. |
| 5,738,817 | A | 4/1998 | Danforth et al. | 2005/0059757 A1 | 3/2005 | Bredt et al. |
| 5,738,921 | A | 4/1998 | Andersen et al. | 2005/0080191 A1 | 4/2005 | Kramer et al. |
| 5,740,051 | A | 4/1998 | Sanders, Jr. et al. | 2005/0093194 A1 | 5/2005 | Oriakhi et al. |
| 5,746,844 | A | 5/1998 | Sterett et al. | 2005/0104241 A1 | 5/2005 | Kritchman et al. |
| 5,746,967 | A | 5/1998 | Hoy et al. | 2005/0110177 A1 | 5/2005 | Schulman et al. |
| 5,749,041 | A | 5/1998 | Lakshminarayan et al. | 2005/0179167 A1 | 8/2005 | Hachikian |
| 5,753,171 | A | 5/1998 | Serbin et al. | 2005/0197431 A1 | 9/2005 | Bredt et al. |
| 5,753,274 | A | 5/1998 | Wilkening et al. | 2005/0212163 A1 | 9/2005 | Bausinger et al. |
| 5,772,947 | A | 6/1998 | Hull et al. | 2005/0230870 A1 | 10/2005 | Oriakhi |
| 5,783,358 | A | 7/1998 | Schulthess et al. | 2006/0071367 A1 | 4/2006 | Hunter et al. |
| 5,800,756 | A | 9/1998 | Andersen et al. | 2006/0141145 A1 | 6/2006 | Davidson et al. |
| 5,805,971 | A | 9/1998 | Akedo | 2006/0230984 A1 | 10/2006 | Bredt et al. |
| 5,851,465 | A | 12/1998 | Bredt | 2007/0007698 A1 | 1/2007 | Sano |
| 5,870,307 | A | 2/1999 | Hull et al. | 2007/0029698 A1 | 2/2007 | Rynerson et al. |
| 5,902,441 | A | 5/1999 | Bredt et al. | 2007/0135531 A1 | 6/2007 | Norcini et al. |
| 5,902,537 | A | 5/1999 | Almquist et al. | 2008/0138515 A1 | 6/2008 | Williams |
| 5,940,674 | A | 8/1999 | Sachs et al. | 2008/0187711 A1 | 8/2008 | Alam et al. |
| 5,943,235 | A | 8/1999 | Earl et al. | 2008/0281019 A1 | 11/2008 | Giller et al. |
| 5,948,874 | A * | 9/1999 | Pike et al. ............ 526/214 | | | |
| 5,965,776 | A | 10/1999 | Leppard et al. | FOREIGN PATENT DOCUMENTS | | |
| 5,976,339 | A | 11/1999 | Andre, Sr. | CN | 1857930 | 11/2006 |
| 6,007,318 | A | 12/1999 | Russell et al. | DE | 197 27 677 | 1/1999 |
| 6,071,675 | A * | 6/2000 | Teng ............ 430/302 | DE | 198 53 834 A | 5/2000 |
| 6,077,887 | A | 6/2000 | Thuresson | DE | 1985 3834 | 5/2000 |
| 6,112,109 | A | 8/2000 | D'Urso | DE | 101 58 233 A | 3/2003 |
| 6,136,088 | A | 10/2000 | Farrington | EP | 0 431 924 | 6/1991 |
| 6,136,948 | A | 10/2000 | Dickens, Jr. et al. | EP | 0 540 203 A | 5/1993 |
| 6,147,138 | A | 11/2000 | Hochsmann et al. | EP | 1226019 | 7/2002 |
| 6,193,922 | B1 | 2/2001 | Ederer | EP | 1475221 | 11/2004 |
| 6,299,677 | B1 | 10/2001 | Johnson et al. | EP | 1491517 | 12/2004 |
| 6,348,679 | B1 | 2/2002 | Ryan et al. | EP | 1498277 | 1/2005 |
| 6,363,606 | B1 | 4/2002 | Johnson, Jr. et al. | EP | 1512519 | 3/2005 |
| 6,375,874 | B1 | 4/2002 | Russell et al. | EP | 1 623 816 | 2/2006 |
| 6,397,922 | B1 | 6/2002 | Sachs et al. | GB | 2048235 A | 12/1980 |
| 6,401,001 | B1 | 6/2002 | Jang et al. | GB | 2155944 A | 10/1985 |
| 6,403,002 | B1 | 6/2002 | Van der Geest | JP | 62260754 A | 11/1987 |
| 6,416,850 | B1 | 7/2002 | Bredt et al. | JP | 03287683 | 12/1991 |
| 6,423,255 | B1 | 7/2002 | Hoechsmann et al. | JP | 5025898 A | 2/1993 |
| 6,433,038 | B1 | 8/2002 | Tanabe et al. | JP | 06-289612 | 10/1994 |
| 6,531,086 | B1 | 3/2003 | Larsson et al. | JP | 9-241311 A | 9/1997 |
| 6,540,784 | B2 | 4/2003 | Barlow et al. | JP | 11-116875 | 4/1999 |
| 6,600,142 | B2 | 7/2003 | Ryan et al. | JP | 2001-162351 | 6/2001 |
| 6,610,429 | B2 | 8/2003 | Bredt et al. | WO | WO-93/19019 A | 9/1993 |
| 6,713,125 | B1 | 3/2004 | Sherwood et al. | WO | 93/25336 | 12/1993 |
| 6,740,423 | B2 | 5/2004 | Murase | WO | 94/12328 | 6/1994 |
| 6,742,456 | B1 | 6/2004 | Kasperchik et al. | WO | WO-94/020274 | 9/1994 |
| 6,780,368 | B2 | 8/2004 | Liu et al. | WO | 95/30503 | 11/1995 |
| 6,799,959 | B1 | 10/2004 | Tochimoto et al. | WO | WO-96/06881 | 3/1996 |
| 6,930,144 | B2 | 8/2005 | Oriakhi | WO | 97/11835 | 4/1997 |
| 6,989,115 | B2 | 1/2006 | Russell et al. | WO | 97/26302 | 7/1997 |
| 7,037,382 | B2 | 5/2006 | Davidson et al. | WO | WO-97/032671 | 9/1997 |
| 7,087,109 | B2 | 8/2006 | Bredt et al. | WO | 98/09798 | 3/1998 |
| 7,120,512 | B2 | 10/2006 | Kramer et al. | WO | WO-98/09798 A1 | 3/1998 |
| 7,285,234 | B2 | 10/2007 | Pfeifer et al. | | | |

| WO | 98/28124 | 7/1998 |
| WO | 98/46415 | 10/1998 |
| WO | 98/51477 | 11/1998 |
| WO | WO-02/38677 | 5/2002 |
| WO | WO-02/064354 | 8/2002 |
| WO | WO-03/016030 | 2/2003 |
| WO | WO-2004/048463 | 6/2004 |
| WO | WO-2004/062927 | 7/2004 |
| WO | WO-2004/096514 | 11/2004 |
| WO | WO-2005/011959 | 2/2005 |
| WO | WO-2005/023524 | 3/2005 |
| WO | WO-2005/025074 | 3/2005 |
| WO | WO-2005/090055 | 9/2005 |
| WO | WO-2005/105412 | 11/2005 |
| WO | WO-2007/039450 | 4/2007 |
| WO | WO-2007/147625 | 12/2007 |

OTHER PUBLICATIONS

Office Action in Japanese Patent Application No. 549079/98, mailed Nov. 27, 2007, 3 pages.
Examination report for European patent Application No. 01 927 008.1, mailed Jan. 23, 2008, 7 pages.
Adamson, Physical Chemistry of Surfaces, Interscience Publishers, Inc. (1967).
Aranson et al., The Physics of Granular Media, pp. 143-164, Hinrichsen & Wolf, eds. (Wiley-VCH 2004).
Brandup et al., Polymer Handbook, pp. 675-714, John Wiley & Sons (1999).
Das, Advanced Soil Mechanics, pp. 313-326 (Hemisphere Press Press 1997).
Definition of "Colorant," Hawley's Condensed Chemical Dictionary, 14th Ed. (2001) p. 287.
Hamill, Search Report dated Jan. 4, 2008, 3 pages.
Hamill, Search Report dated Jan. 30, 2008, 2 pages.
Invitation to Pay Additional Fees & Partial ISR for PCT/US2007/008046, Sep. 18, 2007 (6 pages).
International Search Report & Written Opinion for PCT/US2007/008046, Nov. 15, 2007, 23 pages.
International Search Report & Written Opinion for PCT/US2007/025075, mailed Jun. 12, 2008.
Knapczyk, "Polyallyl Glycidyl Ether Resins for Very Fast Curing High Performance Coatings," 65th Ann. Meeting of Feder. of Soc. for Coating Tech., Oct. 1987, 16 pages.
Pizzi et al., Handbook of Adhesive Technology, pp. 761-773, Marcel Dekker, Inc. (2003).
Rulison, "Wettability Studies for Porous Solids Including Powders and Fibrous Materials-Technical Notice # 302," (1996).
http://toxics.usgs.gov/definitions/kow.html, printed Jun. 24, 2008.
http://www.devicelink.com/mddi/archive/99/09/006.html, printed Jun. 24, 2008.
http://www.cibasc.com/brightening.htm, printed Jun. 24, 2008.
International Search Report & Written Opinion for PCT/US2008/000366, mailed Jun. 20, 2008.
European Search Report dated Apr. 27, 2006 for European Application No. 04 00 1558 (5 pgs.).
Boyer et al., eds., "Metals Handbook," American Society for Metals, pp. 23.5, 23.8-23.13, (1985).
European Search Report for 03029489.6, Feb. 16, 2004, 3 pgs.
Examination report in Canadian Patent Application No. 2,338,617, mailed Aug. 17, 2007 (2 pages).
Grant, Julius, Editor, "Hackh's Chemical Dictionary" Fourth Edition (1972, McGraw-Hill Book Company, New York), p. 250, "ethyl acetate."

International Preliminary Examination Report for Int'l Application No. PCT/US01/12220, Mar. 14, 2003.
International Preliminary Examination Report for PCT/US97/15041, Oct. 19, 1998, 9 pgs.
International Preliminary Report on Patentability, Application No. PCT/US2004/015644, Dec. 8, 2005, 7 pages.
International Search Report and Written Opinion for PCT/US2004/027549.
International Search Report for PCT/US03/29714, Feb. 10, 2004, 6 pages.
International Search Report for PCT/US99/20628, Jan. 21, 2000, 3 pages.
International Search Report of Int'l Application No. PCT/US01/12220, Apr. 15, 2002.
International search Report of Int'l Application No. PCT/US04/015644, Oct. 24, 2005.
Office Action in the The People's Republic of China, Application No. 200480018360, Oct. 13, 2006, 5 pages.
Written Opinion for PCT/US99/20628, Jul. 27, 2000, 10 pages.
Borland, S.W.; "Characterization of Fundamental and Reticulated Biomedical Polymer Structures Fabricated by three Dimensional Printing", (Doctorial Thesis), Massachusetts Institute of Technology.
Ederer, "A 3D Print Process for Inexpensive Plastic Parts," Presentation for the Austin Solid Freeform Conference, 1995.
Examination Report for European Patent Application No. 00 976 896.1—2307, Jan. 28, 2003, 5 pgs.
German, Powder Injection Molding, (1990), pp. 32-43 and 92-95.
International Search Report for PCT/US00/30347, Sep. 24, 2001, 9 pgs.
International Preliminary Examination Report for PCT/US00/30347, Mar. 19, 2002, 28 pgs.
Khanuja, S.S.; "Origin and Control of Anisotrophy in Three Dimensional Printing of Structural Ceramics", (Doctorial Thesis), Massachusetts Institute of Technology, Feb. 1996.
Official Action from Canadian Intellectual Property Office for Canadian Application Serial No. 2,388,046, dated Apr. 10, 2006.
Patent Abstracts of Federal Republic of Germany, DE 4012011 A, Oct. 17, 1991.
Patent Abstracts of Japan, vol. 1999, No. 9, Jul. 30, 1999 and JP 11 116875 A (Teikoku Ink Seizo KK), Apr. 27, 1999.
Patent Abstracts of Japan, vol. 1995 No. 01, Feb. 28, 1995 & JP 06 289612 A (Nippon Zeon Co Ltd), Oct. 18, 1994.
Examination report for European patent Application No. 01 927 008.1, mailed May 11, 2009 (3 pages).
Examination report for European patent Application No. 04 752 633.0, mailed Apr. 22, 2009 (3 pages).
International Preliminary Report on Patentability for Intl. Application No. PCT/US2007/025075, mailed Jun. 18, 2009 (9 pages).
International Preliminary Report on Patentability for Intl. Application No. PCT/US2008/000366, mailed Jul. 23, 2009 (12 pages).
International Preliminary Report on Patentability for PCT/US2007/008046, mailed Oct. 8, 2008 (14 pages).
International Search Report and Written Opinion for PCT/US2008/002362, mailed Nov. 11, 2008 (16 pages).
International Preliminary Report on Patentability for Intl. Application No. PCT/US2008/002362, mailed Sep. 3, 2009 (10 pages).
Office Action in Japanese Patent Application No. 2000-579442, mailed Sep. 8, 2009, 3 pages (translation).
Office Action in Japanese Patent Application No. 2004-540142, mailed Feb. 16, 2010, 6 pages (translation).
Examination report for European patent Application No. 05024830.1, mailed Mar. 5, 2010 (4 pages).
US 4,937,420, 06/1990, Deckard (withdrawn)

* cited by examiner

MATERIAL SYSTEMS AND METHODS OF THREE-DIMENSIONAL PRINTING

RELATED APPLICATION

This application is a divisional of U.S. non-provisional application Ser. No. 09/706,350, filed Nov. 3, 2000, which claims the benefit U.S. provisional application Ser. No. 60/164,100, filed Nov. 5, 1999, entitled "MATERIAL SYSTEMS AND METHODS OF THREE-DIMENSIONAL PRINTING" by James F. Bredt et al. Both of these applications are incorporated herein by reference in their entirety.

FIELD OF THE INVENTION

This invention relates generally to rapid prototyping techniques, and more particularly to three dimensional printing materials, methods, and articles made therefrom.

BACKGROUND OF THE INVENTION

The field of rapid prototyping involves the production of prototype articles and functional parts, as well as ceramic shell molds for metal casting, directly from computer-generated design data.

Two well-known methods for rapid prototyping include a selective laser sintering process and a liquid binder three dimensional printing process, as exemplified by U.S. Pat. No. 5,204,055. The techniques are similar to the extent that they both use layering techniques to build three-dimensional articles. Both methods form successive thin cross sections of the desired article. The individual cross sections are formed by bonding together grains of a granular material on a flat surface of a bed of the granular material. Each layer is bonded to a previously formed layer to form the desired three-dimensional article at the same time as the grains of each layer are bonded together. The laser-sintering and liquid binder techniques are advantageous because they create parts directly from computer-generated design data and can produce parts having complex geometries. Moreover, three-dimensional printing methods can be quicker and less expensive than conventional machining of prototype parts or production of cast or molded parts by conventional "hard" or "soft" tooling techniques which can take from a few weeks to several months, depending on the complexity of the item.

Three-dimensional printing methods have been used to make ceramic molds for investment casting, thereby generating fully-functional metal parts. Additional uses have been contemplated for three-dimensional printing methods.

For example, three-dimensional methods may be useful in design-related fields where the articles may be used for visualization, demonstration and mechanical prototyping. It may also be useful for making patterns for molding processes. Three-dimensional printing methods may be further useful, for example, in the fields of medicine and dentistry, where expected outcomes may be modeled prior to performing procedures. Other businesses that could benefit from rapid prototyping technology include architectural firms, as well as others in which visualization of a design is useful.

A selective laser sintering process is described in U.S. Pat. No. 4,863,568, which is incorporated herein by reference. The selective laser sintering process was commercialized by DTM Corporation. The selective laser sintering process involves spreading a thin layer of powder onto a flat surface. The powder is spread using a tool developed for use with the selective laser sintering process, known in the art as a counter-rolling mechanism (hereinafter "counter-roller"). Using the counter-roller allows thin layers of material to be spread evenly, without disturbing previous layers. After the layer of powder is spread onto the surface, a laser is directs laser energy onto the powder in a predetermined two-dimensional pattern. The laser sinters or fuses the powder together in the areas struck by its energy. The powder can be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

The selective laser sintering process is expensive due to the high cost of the laser and the complexity of the equipment used. In addition, only one laser is used at a time, making it a slow method. In addition, depending on the application, materials are sometimes used in the selective laser sintering method that require special handling or processing facilities.

U.S. Pat. No. 5,204,055, incorporated herein by reference, describes an early three-dimensional printing method which involves the use of an ink-jet printing head to deliver a liquid or colloidal binder material to layers of powdered material. The technique (hereafter "liquid binder method") involves applying a layer of a powdered material to a surface using a counter-roller. After the powdered material is applied to the surface, the ink-jet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier which evaporates, leaving the hardened binder behind. The powdered material can be ceramic, metal, plastic or a composite material, and can also include fiber. The liquid binder material can be organic or inorganic. Typical organic binder materials are polymeric resins, or ceramic precursors such as polycarbosilazane. Inorganic binders are used where the binder is incorporated into the final articles; silica is typically used in such an application.

One advantage of using an ink-jet print head rather than a laser is that inexpensive printheads are commercially available that have a plurality of spray nozzles that can be used to deliver binder to the powder and that are arranged side-by-side in a single print head. In selective laser sintering machines, only one laser, which delivers energy to the powder, is conventionally used. The combination of several spray nozzles increases the speed of liquid binder printing compared to laser-sintering by allowing a wider area to be printed at one time. In addition, the liquid binder printing equipment is much less expensive than the laser equipment due to the high cost of the laser and the high cost of the related beam deflection optics and controls.

The liquid binder printing technique has a serious reliability problem associated with the spray nozzles becoming clogged with the binder and/or powder material. Clogging occurs when binders having high levels of suspended solids are used. The problem with clogging requires frequent interruptions of the build in order to clean the spray nozzle. The clogging problem increases the time and labor required to build parts and to maintain the equipment. Therefore, although the liquid binder printing technique represents an advance in speed and cost over the selective laser sintering process, it suffers from reliability problems that slow down the build rate, increasing labor and equipment maintenance costs. This problem interferes with the potential speed advantage of increased printing capability presented by the plurality of spray nozzles.

In addition to the above-mentioned disadvantages, the powders, especially metallic powders, used in both selective laser sintering and liquid binder techniques present safety issues that render them undesirable for use in an office environment. These safety issues may require special clothing and processing facilities to prevent, for example, skin contact or inhalation of toxic materials. In addition, more expense may be incurred through complying with regulations for the disposal of toxic materials. For these reasons, these techniques do not lend themselves to being used in typical office environments, such as architectural and design firms, or doctors' offices.

U.S. Pat. No. 5,490,962 to Cima discloses solid free-form techniques for making medical devices for controlled release of bioactive agents.

U.S. Pat. No. 5,639,402, to Barlow discloses a method for selectively fusing calcium phosphate particles that are coated, or alternatively mixed with, a polymeric binder material.

SUMMARY OF THE INVENTION

The present invention is directed to improved materials systems and methods for producing appearance models, small numbers of functional parts, etc. in an office environment.

The following illustrative embodiments of the invention provide various methods of three-dimensional printing.

One embodiment provides a first layer of dry particulate material comprising an ionic reactant and dispensing a homogeneous fluid onto a first region of the first layer, the fluid comprising an ionic reactant. An ion exchange reaction is allowed to occur between the particulate reactant and the reactant in the fluid, the reaction causing a solidified material to form in the first region.

One embodiment provides a first layer of a dry particulate material, at least a portion of the particulate material comprising particles having a reactive coating. The method further includes dispensing a fluid onto a first region of the first layer.

One embodiment provides a first layer of a dry particulate material comprising a reactant selected from the group consisting of metals, minerals and ceramic oxides. A homogeneous fluid is dispensed onto a first region of the first layer, the fluid comprising a reactant. A reaction is allowed to occur between the particulate reactant and the reactant in the fluid, the reaction causing a solidified material to form in the first region.

One embodiment provides a first layer of a dry particulate material comprising a particles having a reactive surface. A fluid is dispensed onto a first region of the first layer, the fluid comprising a reactant. A reaction is allowed to occur between the reactive polymer and the reactant in the fluid, the reaction causing a solidified material to form in the first region.

One embodiment provides a first layer of a dry particulate material comprising a reactant. A fluid is dispensed onto a first region of the first layer, the fluid comprising a reactant capable of hydrogen-bonding with the particulate reactant.

One embodiment provides a first layer of a dry particulate material comprising a reactant. A fluid is dispensed onto a first region of the first layer, the fluid comprising a reactant. A reaction is allowed to occur between the particulate reactant and the reactant to form an adhesive, the reaction causing a solidified material to form in the first region.

One embodiment provides a first layer of a dry particulate material. A first fluid is dispensed, the first fluid comprising an adhesive and a second fluid comprising a cross-linking agent onto a first region of the first layer. A cross-linking reaction is allowed to occur, the reaction causing a solidified material to form in the first region.

One embodiment provides a first layer of a dry particulate material. The method further comprises dispensing a first fluid comprising a hydrogen-bond donor and a second fluid comprising a hydrogen-bond acceptor onto a first region of the first layer.

One embodiment provides a first layer of a dry particulate material. The method further comprises dispensing a first fluid comprising a first reactant and a second fluid comprising a second reactant onto a first region of the first layer. A reaction is allowed to occur between the first and second reactants to form an adhesive.

One embodiment provides a first layer of a dry particulate material comprising an adhesive. The method further comprises dispensing a first fluid onto the first layer to dissolve the adhesive and dispensing a fluid solidifying agent onto a first region of the first layer. A reaction is allowed to occur between the first fluid and the solidifying agent, the reaction causing a solidified material to form in the first region.

One embodiment provides a first layer of a dry particulate material. The method further comprises dispensing a fluid monomer onto the first layer and dispensing a fluid comprising an initiator onto a first region of the first layer. A polymerization is allowed to occur, the polymerization causing a solidified material to form in the first region.

One embodiment provides providing a first layer of a dry particulate material comprising a first reactant and a second reactant. A fluid is dispensed onto a region of the first layer. A reaction is allowed to occur between the first and second reactants, the reaction causing a solidified material to form in the first region.

These and other features, aspects and advantages of the present invention will become better understood with reference to the following description and appended claims.

DETAILED DESCRIPTION

Figure 1:
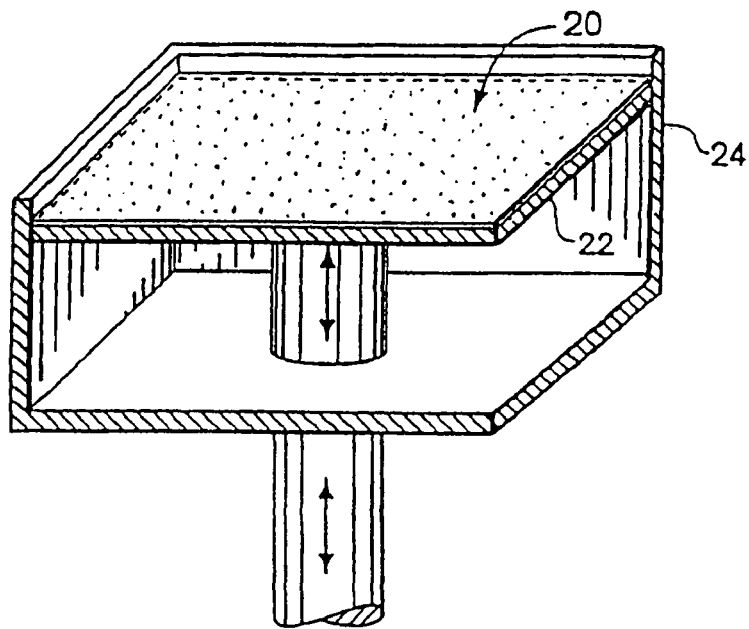
FIG. 1 illustrates schematically a first layer of a mixture of particulate material deposited onto a downwardly movable surface on which an article is to be built, before any fluid has been delivered.

The present invention is now illustrated by describing several aspects and embodiments thereof. One group of embodiments employs two-component materials systems which are applicable to a printing process in which a fluid is dispensed in a predetermined pattern on a layer of dry particulate material.

The majority of prior art three dimensional printing systems employ a one-component materials system. Here, one primary chemical component is responsible for the solidification process which is often aided by exposure of the primary component to an external energy source or applied stimulus, such as UV radiation, microwave radiation, infra-red radiation, or heat.

In the illustrative two-component systems, two chemical reactants are present in either the dispensing fluid, the particulate layer or both, and chemically react to initiate hardening in a region of the desired predetermined pattern. The two component materials systems present several advantages: (1) The reactants can be judiciously chosen to cause an instantaneous chemical reaction which can result in spontaneous hardening in the patterned region; (2) An extra processing step is eliminated—spontaneous hardening avoids the need for exposing the patterned material to an external energy source or an applied stimulus, thus facilitating and speeding up manufacture of the prototype article; and (3) A wider array of different binder and adhesive materials can be present in the final product due to the almost infinite number of chemical reactions possible, as opposed to limiting the choice of adhesives and binders to common, commercially available materials.

The illustrative embodiments of this aspect of the present invention include two-component materials systems and methods which fall under three general classes: (1) a first reactive component in the dispensing fluid and a second reactive component present in a dry particulate layer; (2) two reactive components dispensed as a fluid; and (3) two reactive particulate components in which a dispensing fluid functions to dissolve or disperse the reactants.

These methods have the following in common: providing a dry particulate layer, dispensing a fluid onto the particulate layer, and allowing a reaction to occur. The fluid is dispensed as a predetermined pattern resulting in a the fluid being present in a first region of the particulate layer. A chemical reaction occurs in the first region of the layer instantaneously and spontaneously. A chemical reaction eliminates the need for a subsequent step of curing the material, e.g. by exposing the material to an external energy source or applied stimulus because it is this chemical reaction which causes solidification of the material in the first region. In some cases, curing may be desired. The first region of solidified material is contiguous with a second region of free-flowing particulate material. The chemical reaction results from the two components chemically reacting with each other. "Chemically react," as used herein, results in the dissociation and/or formation of chemical bonds such as covalent bonds, ionic bonds, ionic interactions, hydrogen bonding interactions, and the like. "Solidification," "solidifying," "harden," and "hardening," as used herein, may mean any number of processes that achieve the formation of an integral solid structure (non-pourable) from the dry, free-flowing (pourable) particulate material and the fluid, including, but not limited to, dissolving, evaporating, chemically reacting, activating, free radical initiator curing, binding, adhering, polymerizing, crystallizing, and other transformative processes, including catalyzed processes. Those of skill in the art will recognize that various similar processes can achieve similar results.

Rarely is an entire article printed with only one layer, although this is possible. More commonly, the three dimensional printing method includes the steps of building the article in successive layers. Accordingly, the method further comprises providing a second layer of the dry particulate material over the first layer. The second layer is generally applied soon after fluid has been dispensed onto the first layer. The fluid is then dispensed onto a first region of the second layer and subsequent layers of the particulate material are deposited over a preceding layer followed by the step of dispensing the fluid.

For optimal adherence and/or bonding between the layers, the pattern on the first layer should maintain its "wetness" at the time the second layer is deposited on the first layer. After patterning of the second layer, relatively simultaneous solidification of adjacent patterned regions results in a more integral association between the first and second layer where the respective patterned regions contact each other. The less optimal situation occurs where solidification of the patterned region in the first layer occurs prior to deposition of the second layer. However, for certain compositions, this may be sufficient to provide sufficient inter-layer structural integrity.

The predetermined pattern of a layer may be the same or different from that of an adjacent layer, or any other layer. It is readily understood that in order to form an integral three-dimensional article, at least one portion of a region of the predetermined pattern in one layer must contact at least a portion of the patterned region in an adjacent layer or layers. The pattern for each layer is inputted from a computer. The accumulation of external surfaces of each pattern represents a three dimensional model in computer memory.

The final shape of the three-dimensional article is defined by the collective contours of each of the layers. Structural aspects (i.e. strength, stiffness, and so on) are only relevant in so far as they maintain the external shape of the part. This is in contrast to drywall and paper cups which are typically molded from a single sheet or a pressed stack of sheets. Such functional materials demand more than mere visualization. The mechanical properties of these products are required to support loads and stresses from actual use, i.e. supporting a structure or containing a solid or liquid. In addition, sheet-forming and lamination processes have different assembly procedures from 3-D printing. In sheet-forming processes for functional finished articles of manufacture, the sheets are initially assembled edge-to-edge, and the viewable surface is simply the broad side of the sheet. Three-dimensional printing, in contrast, unites faces of thin layers to form a stack, the layers having a predetermined contour. The viewable surface of a three-dimensional printed article comprises layer edges only, save for the uppermost and lowermost layers in certain cases.

In embodiments of the present invention, the printed three-dimensional article is also known as a "prototype article," which as used herein, is meant to define a relatively easily produced model, such as representations of a bone, or a representation of a production part, such as a gear, bearing, shaft, etc., made of material completely different from that which the production part is made, for purposes of simplicity, speed, and economy. A prototype article is typically made for visualization purposes only and structural integrity of the prototype article usually does not meet the requirements needed for the corresponding functional article.

Liquid/Solid Reactive Component Systems

The following embodiments relate to the first class of two-component systems in which a first reactant is present in the particulate material and a second reactant is present in the dispensing fluid.

In one embodiment, the method of three-dimensional printing provides a first layer of dry particulate material comprising an ionic reactant. "Ionic reactant" as used herein refers to a charged species (or electrostatically charged species) neutralized by a counterion. Examples of ionic reactants include salts, acids and bases or any other such ionically-bonded compounds. The layer of particulate material comprising the ionic reactant can be a layer of particulate ionic reactant only or a mixture of particulate ionic reactant and an inert filler. Examples of inert fillers are described more fully below. A homogeneous fluid is dispensed onto a first region of the first layer, the fluid comprising an ionic reactant. "Homogeneous fluid" as used herein refers to the liquid state. In this embodiment, the homogeneous fluid can comprise a liquid reactant in pure form or miscible with another fluid, typically an inert fluid. Alternatively, the ionic reactant can be a solid which is soluble in a fluid, typically an inert fluid. In either case, the inert fluid is most often a solvent, such as an organic solvent or water.

In this embodiment, an ion exchange reaction is allowed to occur between the particulate reactant and the reactant in the fluid, both reactants being ionic reactants. An "ion exchange" reaction as used herein results in ionic reactant having a different counterion after the ion exchange. Preferably, the one ionic reactant comprises a cation or anion of interest which is to be ultimately combined with the second ionic reactant having a corresponding anion or cation of interest, ultimately forming the desired ionically-bonded compound. The respective counterions not of interest also combine to form a salt, acid or base. The ion exchange is facilitated or made possible in the presence of the fluid, which not only provides one of the ionic reactants but also functions to dissolve the ionic reactants to facilitate or make possible the ion exchange reaction. Thus, the fluid provides a medium through which the electrostatic charges on the particulate material may interact with the ionic reactant in the fluid. Formation of the desired ionically-bonded compound causes a solidified material to form in the first region of the first layer.

In one embodiment, the ionic reactant in the fluid is an electrolyte which can be a small molecule or a polymer having multiple charged sites, i.e. a polyelectrolyte. The particulate reactant can be soluble or insoluble in the fluid. Examples of soluble particulate cationic polyelectrolytes include polyallylamine hydrochloride, polybutylaminoethyl methacrylate, polyethyleneimine, polyvinyl pyridine and poly diallyldimethylammonium chloride. Examples of insoluble cationic polyelectrolytes include Empresol N, Unicat KC1420, Unicat C3T (all from Kalamazoo Paper Chemicals), Pencat 600, Apollo 4280 (from Penford Corp) and aminosilane-functionalized glass beads. For these examples, the reactant in the fluid is a soluble anionic reactant such as sulfonated polystyrene, polyacrylic acid (PAA), polymethacrylic acid (PMAA), polyvinyl sulfonic acid, alkali metal salts of polyacrylic acid, alkali metal salts of polymethacrylic acid, alkali metal salts of polyvinyl sulfonic acid, ammonium salt of polyvinylsulfonic acid, ammonium salt of sulfonated polystyrene, ammonium salt of polyacrylic acid, ammonium salt of polymethacrylic acid and copolymer of sodium styrene sulfonate with maleic anhydride (Versa TL-3 from Alco Chemicals).

The examples of anionic reactants in the fluid can also be provided as the particulate reactant. Alternatively, the particulate reactant can be an insoluble anionic reactant such as Astro-gum 3010 or Astro-gum 21. Accordingly, the reactant in the fluid is a soluble cationic reactant, such as any of those listed above.

Any concentration of polyelectrolyte in the fluid material may be used with the electrostatically charged particulate material of the present embodiment. A polyelectrolyte concentration of about 3% has been found suitable in some instances.

Other suitable polyelectrolytes include, but are not limited to, PMAA, poly(styrene sulfonate, sodium salt) (PSS), (PAA), and poly(diallyldimethylammonium chloride) (PDAC). Preferred polyelectrolytes include PMAA (6,000 molecular weight, 30% aqueous solution, available from Aldrich Chemicals), PAA powder (2,000 molecular weight available from Fluka), PSS powder (mw 70,000, available from Aldrich Chemicals), and PDAC (20% aqueous solution, mw ~150,000, available from Aldrich Chemicals).

The electrostatically charged materials may be mixed in any ratio. Suitable ratios have been found to be about a 1:1 ratio based on the charge density of each component. Suitable cationically charged materials include cationically charged starches and polymers containing quarternary amines. Preferred cationically charged starches include, but are not limited to, Empresol N (Kalamazoo Paper Chemicals, Kalamazoo Mich.), Apollo 4280 and Pencat 600 (available from Penford Products Co., Cedar Rapids, Iowa). Suitable anionically charged materials include anionically charged starches and polymers containing sulfonate, phosphate, and carboxylic acid groups. Preferred anionically charged starches include, but are not limited to, Astro Gum 3010 and Astro Gum 21 (available from Penford Products Co., Cedar Rapids, Iowa).

Preferred material systems according to the present embodiment include, but are not limited to, a mixture of an aqueous fluid with any one of a particulate material that includes the following combinations: sodium polystyrene sulfonate and a cationic starch; polycationic and polyanionic powders; and, anionic polymers and polyvalent salts.

Another embodiment of the present invention provides a method including the step of providing a first layer of a dry particulate material in which at least a portion of the particulate material comprises particles having a reactive coating. This embodiment widens the scope of possible reactive particles. Certain reactive groups may not have been accessible as pure particles, or the solid form was not structurally stable. However, a solution of such reactive groups can be coated onto an inert particle, resulting in an effectively reactive particle. The coating process can be performed by spraying a solution or pure liquid of reactive groups onto an inert particle or dipping the inert particle into the reactive group solution or pure liquid. The resulting particle may comprise reactive groups adsorbed on the surface of the particle or covalently bonded to the surface of the particle. "Inert" in this instance refers to inertness with respect to the reaction resulting in solidification for the printing. Thus, an inert particle can be surface-derivatized to result in covalently bound reactive groups, and this can be achieved by methods known particularly in the field of manufacturing derivatized chromatographic materials.

The layer of particulate material can be a pure collection of particles having reactive coatings, or a mixture of inert particles and the particles having reactive coatings. Examples of groups which can form a reactive coating include phenolic precursors, vinyl groups, acids, bases, isocyanates, cyanoacrylates, epoxides, amines, carboxylic acids, hydroxyl groups, acetates, amides and esters.

In one embodiment, a reaction is allowed to occur between the reactive coating and a reactant in the fluid, in which the reaction causes a solidified material to form in the first region. The reaction can be any of the chemical reactions described herein.

The reactive coatings can be reacted with reactants in the fluid or with soluble reactants in the particulate material.

For example, the reactive coating and the reactant in the fluid can be a charged species and the resulting reaction is an ion-exchange reaction as discussed above. Thus, the coating can be anionic or cationic, and can include any of the soluble anionic or cationic reactants listed herein. Accordingly, the reactant in the fluid will be an ionic reactant of opposing charge. Additionally, coatings that react with soluble cationic reactants include acids, carboxylic acids, and adsorbed anionic polyelectrolytes. Coatings that react with soluble anionic reactants include bases, amines, hydroxyl groups, and adsorbed cationic polyelectrolytes. The reaction can be an acid/base reaction in which the reactive coating provides the fluid-soluble acid or base.

Alternatively, a hydrogen-bonding reaction can occur in which the reactive coating can be any hydrogen-bond donor or acceptor listed herein. Additionally, coatings that react with hydrogen-bond donors carboxylic acids, oxides, isocyanates, epoxides, acetates, amides, esters, and adsorbed hydrogen-bond acceptors. Coatings that react with H-bond acceptors include acids, amines, carboxylic acids, hydroxyl groups, alcohols, amides, and adsorbed hydrogen-bond donors.

The reactive groups can provide a catalyst and the reactant in the fluid can be a monomer in which the ensuing reaction is a polymerization catalyzed by any of a variety of polymerization catalysts including ionic (cationic or anionic) or free-radical initiators (examples of monomers and initiators are described and listed herein). The reaction can involve covalent bond dissociation and/or formation. Coatings that can participate in polymerization reactions include any of the monomers listed herein, including vinyl groups, cyanoacrylates, epoxies, and amines. An appropriate initiator (cationic- or free-radical) is present in the particulate material.

Such coatings may also be desirable, for example, to improve adhesion.

Another embodiment of the present invention provides a method including the step of providing a first layer of a dry particulate material comprising a reactant such as metals, minerals and ceramic oxides. A fluid is dispensed onto a first region of the first layer in which the fluid comprises a reactant allowing a reaction to occur between the particulate reactant and the reactant in the fluid, the reaction causing a solidified material to form in the first region.

This embodiment exploits the reactive nature of metals, minerals and ceramic oxides in conjunction with fluid reactants such as polymers. The polymer can be cross-linked by the metal, mineral or ceramic oxide. The polymer can be capable of an ion exchange reaction with the metal, mineral or ceramic oxide. Alternatively, the reaction can be a neutralization reaction, causing precipitation and/or cross-linking to occur, resulting in the solidification.

Examples of reactants in the fluid include sulfonated polystyrene, polyacrylic acid, polymethacrylic acid, polyvinyl sulfonic acid, alkali metal salts of polyacrylic acid, alkali metal salts of polymethacrylic acid, alkali metal salts of polyvinyl sulfonic acid, ammonium salt of sulfonated polystyrene, ammonium salt of polyvinylsulfonic acid, ammonium salt of polyacrylic acid, ammonium salt of polymethacrylic acid and copolymer of sodium styrene sulfonate with maleic anhydride. As a more specific example, polyacrylic acid is capable of oxidizing a metal such as iron or copper, to a salt of the acid (e.g. iron polyacrylate). The metal polyacrylate forms a solid film on the surface of the particles. The metal cations can diffuse about the acidic solution with the effect of solidifing the polyacrylic acid.

Examples of metals include iron, copper, carbon steel, stainless steel, aluminum, brass, molybdenum, tungsten, magnesium, and cobalt.

Examples of ceramic oxides include alumina ($Al_2O_3$), anatase ($TiO_2$), silicon dioxide, aluminum silicate and glass.

Example of minerals include limestone ($CaCO_3$), magnetite, calcium silicate ($CaSiO_4$), hydrous calcium sulfate ($CaSO_4.2H_2O$), hydrated lime ($Ca(OH)_2$) and calcium phosphate.

Another embodiment of the present invention provides a method including the step of providing a first layer of a dry particulate material comprising a reactive surface. A fluid is dispensed onto a first region of the first layer, in which the fluid comprises a reactant. A reaction is allowed to occur between the reactive surface and the reactant in the fluid, the reaction causing a solidified material to form in the first region. The reactive surface can comprise an inert particle having a reactive coating or an entire particle that is reactive.

Examples of reactive polymers include those having polyol groups which can react with isocyanate reactants in the fluid. An ion exchange reaction can occur between sodium polystyrene sulfonate particles and cationic polyelectrolytes in the fluid, such as any of the cationic polyelectrolytes previously mentioned.

Alternatively, the reaction can be a polymerization reaction in which an initiator is present in the fluid and the particulate material further comprise a monomer that is soluble in the fluid. Examples of such monomers include vinylic monomer, an acrylic monomer and a dienic monomer. Other monomers include acrylic acid, methacrylic acid, acrylamide and styrene. Examples of initiators include potassium persulfate, ammonium persulfate, sulfuric acid, perchloric acid, fluorosulfonic acid, trifluoromethylsulfonic acid, trifluroacetic acid, tin tetrachloride, aluminum trichloride, and boron trifluoride, potassium peroxodisulfate, ammonium persulfate with N,N,N',N'-tetramethylethylenediamine (TMEDA), 3-dimethylaminopropionitrile (DMAPN, potassium persulfate with 4,4-azobis(4-cyanovaleric acid), dibenzoyl peroxide, t-butyl perbenzoate and azobisisobutyronitrile.

Where the particle is a reactive polymer examples include an unsaturated polyester, polybutadiene, polyisoprene, an unsaturated polyurethane and copolymers thereof.

Examples of reactive coatings or reactive particles include sodium polystyrene sulfonate, sulfonated polystyrene, polyacrylic acid, polymethacrylic acid, polyvinyl sulfonic acid, alkali metal salts of polyacrylic acid, alkali metal salts of polymethacrylic acid, alkali metal salts of polyvinyl sulfonic acid, ammonium salt of polyvinylsulfonic acid, ammonium salt of sulfonated polystyrene, ammonium salt of polyacrylic acid, ammonium salt of polymethacrylic acid and copolymer of sodium styrene sulfonate with maleic anhydride.

Another embodiment of the present invention exploits hydrogen bonding reactions that result in solidification of the particulate material. In this embodiment, a method includes the step of providing a first layer of a dry particulate material comprising a reactant and dispensing a fluid onto a first region of the first layer. The fluid comprising the reactant is capable of hydrogen-bonding with the particulate reactant. Hydrogen bonding is allowed to occur between the particulate reactant and the reactant in the fluid, in which the hydrogen bonding causes a solidified material to form in the first region.

In one embodiment, the particulate material comprises a particulate reactant which is soluble in the fluid. The particulate reactant can either be a hydrogen-bond donor or hydrogen-bond acceptor and the corresponding reactant in the fluid is a hydrogen-bond acceptor or a hydrogen-bond donor. Examples of hydrogen-bond acceptors and donors are listed herein.

Examples of adhesive/cross-linking agent combinations include polyvinyl alcohol/Borax, polyvinyl alcohol/polyethylene oxide and polyethylene oxide/polymethacrylic acid.

In the preceding examples, at least one of the reactants in itself has properties of an adhesive. Another embodiment of the present invention provides a method by which the neither of the reactants has properties of an adhesive, but rather an adhesive is formed upon reaction of the two reactants. The method includes the step of providing a first layer of a dry particulate material comprising a reactant a fluid is dispensed onto a first region of the first layer, in which the fluid comprises a reactant. A reaction is allowed to occur between the particulate reactant and the reactant to form an adhesive. Formation of the adhesive, (or occurrence of the reaction) causes a solidified material to form in the first region.

Examples of reactant in the fluid include 2-amino-2-methyl 1-propanol (AMP), 2-amino-2-methyl 1-3 propanediol (AMPD), 2-amino-2-ethyl 1-3-propanediol (AEPD), and a hydroxide. Specific hydroxides include sodium hydroxide, potassium hydroxide, and ammonium hydroxide. Examples of particulate reactants which can react with these listed examples of reactants in the fluid include a copolymer of octacrylamide/acrylates/butylaminoethylmethacrylate, e.g. Amphomer LV 71 (National Starch & Chemical, Bridgewater, N.J.). An additional benefit of such systems is the ability to self cross-link.

Other combinations include particulate reactants such as urea, a phenolic resin and melamine in which corresponding reactants in the fluid can be formaldehyde.

Liquid/Liquid Reactive Component Systems

The following embodiments relate to the second class of two-component systems in which a first reactant and second reactant is present in the dispensing fluid. In general, the first and second reactants are provided in separate dispensing fluids due to their propensity to react with each other. The two reactants can be applied simultaneously or successively. Both reactants can be patterned on the layer, or one reactant can be applied throughout the particulate layer thereby wetting the particulate material. The other layer can be printed on the wetted particulate material such that solidification occurs only on the printed region of the layer. The dispensing fluids are homogeneous fluids, as described previously.

For example, when two fluid materials are used, they may each include one part of a two-part adhesive that react together to form an adhesive, which then hardens to form an essentially solid article that includes any remaining particulate material. A specific example of such a system is a two-part epoxy adhesive or structural acrylic, in which the both parts are fluid and are dispensed through separate print-head nozzles.

Both fluids are patterned on the dry particulate layer, either successively or simultaneously through multiple print heads. This avoids a wasteful process of wetting the entire layer with a fluid. Wetting the entire layer may also increase toxicity of the process.

Another embodiment of the present invention provides a method including the step of providing a first layer of a dry particulate material. The method also involves dispensing a first fluid comprising an adhesive and a second fluid comprising a cross-linking agent onto a first region of the first layer. A cross-linking reaction is allowed to occur in which the reaction causes a solidified material to form in the first region.

For example, the adhesive can be polyvinyl alcohol and the cross-linking agent can be sodium tetraborate ($Na_2B_4O_7$), e.g. Borax.

Another embodiment of the present invention exploits hydrogen-bonding interactions caused by two reactants in the fluid. A first fluid comprising a hydrogen-bond donor and a second fluid comprising a hydrogen-bond acceptor is dispensed onto a first region of a first layer of a dry particulate material. The method further comprises the step of allowing hydrogen bonding to occur between the hydrogen-bond donor and acceptor. The hydrogen bonding causes a solidified material to form in the first region.

Examples of hydrogen-bond donors and acceptors include those described herein.

Another embodiment of the present invention provides an adhesive formed by the reaction of the two reactants in the fluid. Prior to the reaction, neither of the reactants in itself is an adhesive. The method involves providing a first layer of a dry particulate material and dispensing a first fluid comprising a first reactant and a second fluid comprising a second reactant onto a first region of the first layer. The method further comprises allowing a reaction to occur between the first and second reactants to form an adhesive. Formation of the adhesive causes a solidified material to form in the first region.

As an example the first reactant can be an isocyanate such as Bayhydur XP-7063 (Bayer) and the second reactant can be a polyol. Examples of polyols include glycerol, sorbitol, erythritol and polyvinyl alcohol.

Another embodiment of the present invention provides a first fluid to dissolve an adhesive in the powder and a reactant in the fluid which is a solidification agent. The solidification process can result from ionic bonding via ion-exchange reactions, resulting precipitation via neutralization, or cross-linking. A neutralization reaction can also result in cross-linking. Accordingly, the method provides a first layer of a dry particulate material comprising an adhesive. A first fluid is dispensed onto the first layer to dissolve the adhesive. A second fluid comprising a cross-linking agent is dispensed onto a first region of the first layer. A reaction is allowed to occur between the first fluid and the cross-linking agent, in which the reaction causes a solidified material to form in the first region.

Thus, the particulate adhesive must be soluble in the first fluid. The first fluid can be a pure fluid such as a solvent or water, or it can be a solution such as an acidic or basic solution. Alternatively, the adhesive can react with the first fluid to form another reactive species.

An example of a soluble particulate adhesive is octacrylamide/acrylates/butylaminoethylmethacrylate, e.g. Amphomer and an example of a first fluid capable of dissolving this adhesive includes aqueous solutions of 2-amino-2-methyl-1-propanol (AMP) and potassium hydroxide. The solidification agent can be an acid such as hydrochloric acid, citric acid, succinic acid and adipic acid which neutralizes the soluble adhesive and causes subsequent precipitation. A polymeric acid such as polyacrylic acid (PAA) or polymethacrylic acid (PMAA) can both neutralize and crosslink the adhesive.

Another embodiment of the present invention takes advantage of polymer formation to harden a region of the particulate layer. The ensuing polymer does not need to be a known adhesive per se. Rather it is the formation of the polymer matrix supporting the particulate material which causes hardening of the patterned region in the layer. Accordingly, this method provides a first layer of a dry particulate material. A fluid monomer is dispensed onto the first layer. A fluid comprising an initiator is dispensed onto a first region of the first layer. Polymerization is allowed to occur, in which the polymerization causing a solidified material to form in the first region.

The initiator can be a cationic or a free-radical initiator. Examples of cationic initiators include sulfuric acid, perchloric acid, fluorosulfonic acid, trifluoromethylsulfonic acid, trifluoroacetic acid, tin tetrachloride, aluminum trichloride, and boron trifluoride. Monomers which can be polymerized with these examples of initiators include isobutene, alkenes, alkylvinyl ethers, vinylacetals, dienes, styrene, N-vinyl carbazole, beta-pinene, oxiranes, N-substituted aziridines, lactams and oxazolines.

Examples of a free-radical initiator include potassium peroxodisulfate, ammonium persulfate with N,N,N',N'-tetramethylethylenediamine (TMEDA) or 3-dimethylaminopropionitrile (DMAPN), potassium persulfate with 4,4-azobis(4-cyanovaleric acid), dibenzoyl peroxide, t-butyl perbenzoate and azobisisobutyronitrile. Monomers which can be polymerized with these examples of initiators include vinylic monomers, acrylic monomers, dienic monomers, acrylic acid, methacrylic acid and acrylamide.

Solid/Solid Reactive Component Systems

The following embodiments relate to the second class of two-component systems in which a first reactant and second reactant is present in the layer of particulate material. A fluid dispensed onto this layer can dissolve either one or both of the solid reactants. The fluid is a homogeneous fluid, as described previously.

Accordingly, one embodiment of the present invention provides a method providing a first layer of a dry particulate material comprising a first reactant and a second reactant. A fluid is dispensed onto a region of the first layer. A reaction between the first and second reactants is allowed to occur, in which the reaction causes a solidified material to form in the first region.

In one embodiment, the fluid dissolves both the first and second reactant. The reaction can be an ion-exchange reaction in which the first reactant can be any of the soluble cationic or anionic reactants described herein and correspondingly, the second reactant can be a soluble ionic reactant having an charge opposite that of the first reactant. The second reactant also can be any one of the soluble cationic or anionic reactants described herein. An example includes a powder of acrylonitrile/butadiene/styrene copolymer coated with sodium polystyrene sulfonate and blended with a cationic polyelectrolyte. In this combination, the coating on the polymer particles can react with the cationic polyelectrolyte.

Alternatively, the first and/or second reactant can comprise an inert bead coated with a solution comprising any of the soluble anionic or cationic polyelectrolytes mentioned previously.

Other examples include amine-functionalized glass beads reacting with an anionic polyelectrolyte, and tosylate-functionalized carbon black reacting with a cationic polyelectrolyte in dry form in the powder, or epoxy-functionalized glass beads with amines in dry form in the particulate material, or powders coated with any adhesive listed herein.

Alternatively, the first and second reactants can be soluble hydrogen donors and hydrogen acceptors respectively, as described herein.

In another embodiment, one of the reactants is insoluble in the fluid and the other reactant is soluble in the fluid.

In one embodiment, the first reactant is a metal, a ceramic oxide or mineral that is capable of reacting with a particulate polymer that is soluble upon dispensing the fluid and is capable of solidification upon reaction with the metal, metal oxide or ceramic. Alternatively, the particulate polymer can be an inert bead coated with a soluble reactive polymer capable of solidification. Examples of soluble particulate polymers include sulfonated polystyrene, polyacrylic acid, polymethacrylic acid, polyvinyl sulfonic acid, alkali metal salts of polyacrylic acid, alkali metal salts of polymethacrylic acid, alkali metal salts of polyvinyl sulfonic acid, ammonium salt of sulfonated polystyrene, ammonium salt of polyacrylic acid, ammonium salt of polymethacrylic acid and copolymer of sodium styrene sulfonate with maleic anhydride. As a more specific example, polyacrylic acid is capable of oxidizing a metal such as iron or copper, to a salt of the acid (e.g. iron polyacrylate). The metal polyacrylate forms a solid film on the surface of the particles. The metal cations can diffuse about the acidic solution with the effect of solidifing the polyacrylic acid.

Specific examples metals and oxide ceramics which react with acid polyelectrolytes in dry particulate material. Polystyrene sulfonate or sodium polystyrene sulfonate copolymerized with maleic anhydride (Versa TL-3 from Alco Chemicals) or any of the polyelectrolytes mentioned previously can be present in the particulate material and which are soluble in a fluid of an acid such as acetic acid or HCl could react with metals, ceramic oxides or minerals as listed herein.

Particulate Materials

For purposes of the present invention, "particulate material" is meant to define any material containing significant amounts of particulate material. The particulate material may react with, be soluble in, or interact with the fluid material, or any portion thereof, depending upon the particular embodiment of the invention that is being practiced. For example, in certain embodiments, it may be desirable that the particulate material dissolve in the fluid material. Similarly, in other embodiments it may be desirable that the particulate material chemically react with the fluid material. In yet other embodiments, it may be desirable that the fluid and particulate material interact to the degree that the fluid material, or a portion thereof, hardens around at least a portion of the particulate material.

Generally, the size of the particles in the particulate material is limited by the thickness of the layers to be printed. That is, the particles are preferably approximately smaller than the thickness of the layers to be printed. The particulate materials may have any regular or irregular shape. Using smaller particles may provide advantages such as smaller feature size, the ability to use thinner layers, and the ability to reduce what is known in the art as a "stair stepping" effect. In preferred embodiments, the material systems include particulate material having particles with a mean diameter ranging from about 1 µm to about 300 µm, preferably ranging from about 2 µm to about 100 µm, preferably ranging from about 10 µm to about 300 µm, more preferably ranging from about 10 µm to about 100 µm, and more preferably ranging from about 10 µm to about 50 µm.

The particulate material can include inert particles. The inert particles or any portion of the particulate material can comprise granular, powdered or fibrous materials.

Classes of inert particles include a polymer, a ceramic, a metal, an organic material, an inorganic material, a mineral, clay and a salt.

Examples of inert polymers include poly(methyl methacrylate), polystyrene, polyamide, polyester, a latex, polyethylene, polypropylene, polyurethane, polyvinyl chloride, polyvinyl acetate, cross-linked polyvinyl pyrrolidone, hydrophilic polyurethane, poly(ethylene terephthalate), thermoplastic urethane, styrene-acrylonitrile copolymer, thermoplastic polyolefin, an epoxy-based polymer, polyether, polyamine, a polyacid, a polycarbonate, a vinyl polymer, an aromatic polyamide, a diene polymer, poly(phenylene oxide), polysiloxane, polynorbornene, polyisoprene, a polyphenylene ether, styrene-butadiene block copolymer, acrylonitrile-butadiene-styrene, high impact polystyrene and copolymers thereof.

Examples of inert ceramics include gypsum, limestone, clay, aluminum oxide, aluminum silicate, calcium silicate, silicon dioxide, titanium dioxide, glass, iron oxide, zinc oxide, magnetite, aluminum hydroxide, magnesium oxide, calcium phosphate, zirconium silicate, silicon carbide, boron nitride, boron carbide and borosilicate.

Examples of inert organic materials include starch, cellulose, wood powder, wax, resin, bone, protein, carbohydrates, sugars, textile fibers and dietary fibers.

Examples of inert salts include sodium carbonate, sodium bicarbonate, sodium borate, sodium chloride, sodium sulfate, potassium sulfate, potassium chloride, magnesium sulfate, magnesium chloride, potassium aluminum sulfate, sodium polyphosphate, sodium acetate, hydrous calcium sulfate, calcium phosphate, sodium silicate, and hydrated lime ($Ca(OH)_2$).

Choosing a suitable particulate material for the material systems of the present invention involves various qualitative evaluations, which may easily be accomplished through routine experimentation by those of ordinary skill in the art. First, a small mound of particulate material is formed, a small depression is formed in the mound, and a small amount of fluid is placed in the depression. Visual observations are made regarding, among other things, the rate at which the fluid diffuses into the particulate material, the viscosity of the particulate material introduction of the fluid, and whether a membrane is formed around the fluid. Next, line testing is performed by filling a syringe filled with fluid and strafing the mounds of particulate material. After a period of about 24 hours, the mounds of particulate material are examined. Those in which pebbles of particulate material have formed are most suitable, as it means that the particulate material and fluid react more quickly than the fluid can evaporate or diffuse into the surrounding dry powder. Those in which both pebbles and rods of hardened material have formed are the most suitable, indicating that the rate at which the fluid and particulate material harden is greater than the rate at which fluid evaporates or diffuses into the surrounding dry powder. In some instances, the rods of hardened material will shrink, indicating that the particulate material may give rise to problems with distortions. As described above, various additives may be included in the particulate material and/or fluid to accelerate the rate at which the particulate material hardens.

The particulate material may also be evaluated to determine the ease of spreading. Simple test parts may also be formed to determine, inter alia, the flexural strength, the distortion, the rate of hardening, the optimum layer thickness, and the optimum ratio of fluid to particulate material. Material systems suitable for use in the three-dimensional printing method include those hardening with minimal distortion, in addition to relatively high flexural strength. That is, hardened products with high flexural strength values may not be suitable for use in the three-dimensional printing method, if distortions compromise the accuracy of the final printed articles; this is especially applicable where relatively fine features are desired.

After a material has been identified as a candidate material for process through line testing, the formula may be further developed by printing test patterns on a 3-D Printer. The strength, accuracy, and degree of difficulty in handling may all be characterized with a set of test parts (e.g., breaking bars for strength and gauge blocks for accuracy). These tests may be repeated as much as necessary, and powder formulas are iterated until optimum characteristics are obtained.

Various processing aids may be added to the particulate material, the fluid, or both, including, but not limited to, accelerators, adhesives, flowrate enhancers, humectants, and visible dyes, fiber, filler, and combinations thereof. Examples of these and other additives may be found in U.S. Pat. No. 5,902,441.

Suitable particulate materials for the present material system include any of those described above. One preferred particulate material includes glass beads. Suitable glass beads range in size from about 10 to about 200 microns. Preferred glass beads include 70 micron diameter and 119 micron diameter glass beads (available under the product name of Spheriglass #2530 and #2227, from Potters Industries Inc., Valley Forge, Pa.). Another preferred particulate material includes glass beads coated with a coupling agent (available under the product name of Spheriglass #2530-CP-03 and #2227-CP-03 from Potters Industries Inc.). Preferably, the coupling agents are attached to the glass beads using, for example, silane chemistry, which is well known to those of skill in the art.

In general, increasing the ratio of fluid to particulate material increases strength of the final article. Therefore, maximizing the amount of fluid printed to the particulate material layer will generally increase the strength of the final article, but sometimes at the expense of increasing the amount and/or severity of distortions in the printed article. "Distortions," as used herein, includes, but is not limited to warping, caking, and bleeding. Consequently, the ratio of fluid to particulate material is practically limited by several factors, including the desired speed of printing, and the acceptable amount of distortion in the final article. In order to prevent the nozzles from clogging, it may be desirable to include various processing aids in the fluid. Examples of these and other additives may be found in U.S. Pat. No. 5,902,441, which is hereby incorporated by reference in its entirety.

Figure 3:
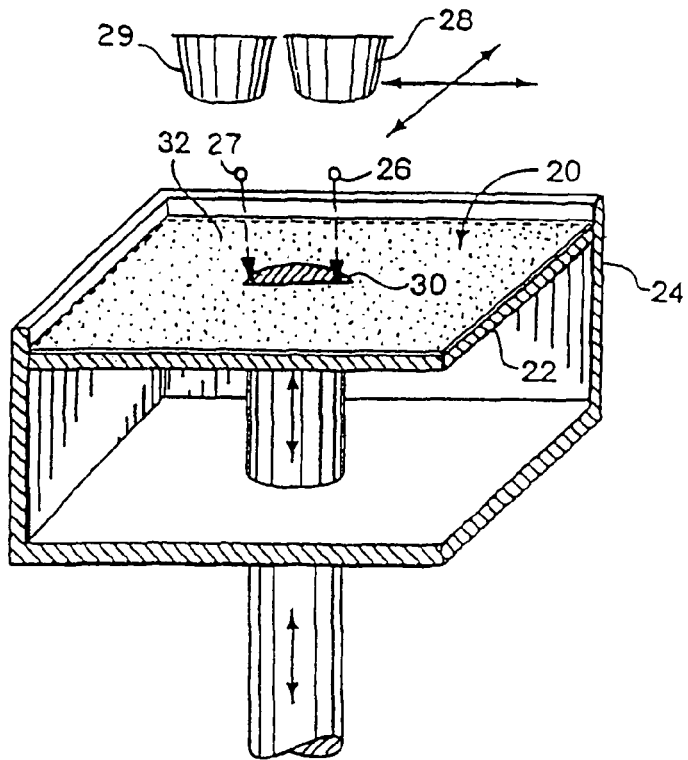
FIG. 3 illustrates schematically two ink-jet nozzles delivering two fluid materials to a portion of the layer of particulate material of FIG. 1 in a predetermined pattern.

Referring now to FIGS. 1 and 3, a schematic representation of a printing method using the materials system of the present invention is presented. According to the method, a layer of particulate material 20 is applied on a downwardly movable surface 22 of a container 24. The layer of particulate material 20 may be formed in any manner, and preferably is applied using a counter-roller, which minimizes disruption of any previously applied layers. The thickness of an individual layer used to build the prototype articles of the present invention preferably ranges from about 12 µm to about 1000 µm, more preferably from about 25 µm to about 250 µm, and more preferably still from about 80 µm to about 180 µm. In theory, there is no limit on the thickness of the layers of particulate material other than the capability of the equipment being used. In practice, the layers of particulate material are typically limited by the amount of fluid that may be delivered to the layer, as described below.

Figure 2:
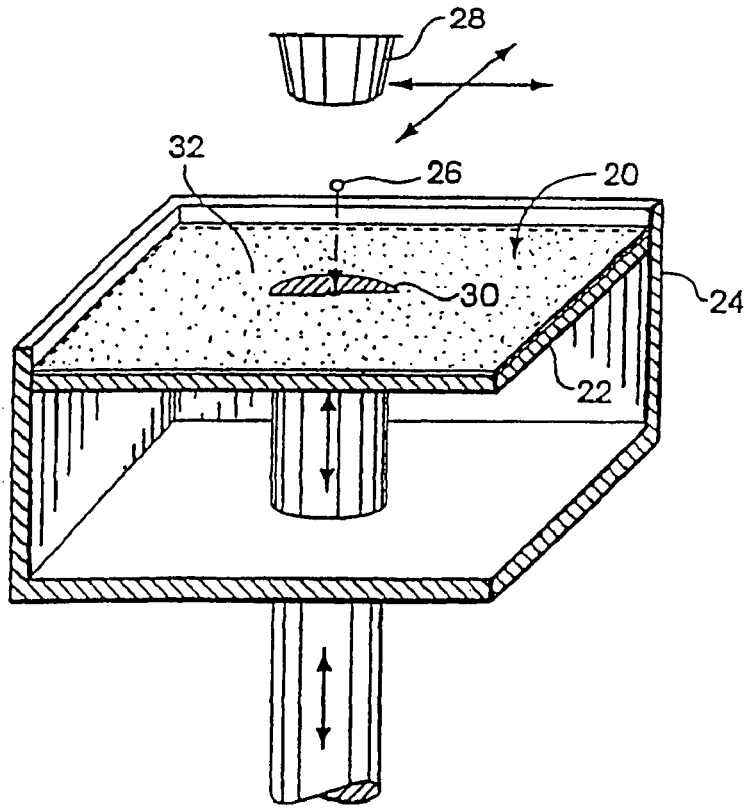
FIG. 2 illustrates schematically an ink-jet nozzle delivering a fluid material to a portion of the layer of particulate material of FIG. 1 in a predetermined pattern.

FIG. 2 is a schematic representation of an ink-jet nozzle 28 delivering a plurality of droplets of a fluid 26 to a portion 30 of the layer 20 of the particulate material in a two-dimensional pattern. According to the method, the fluid 26 is delivered, or printed, to the layer of particulate material in any predetermined two-dimensional pattern (circular, in the figures, for purposes of illustration only), using any convenient mechanism, such as a Drop-On-Demand (hereinafter "DOD") printhead driven by customized software which receives data from a computer-assisted-design (hereinafter "CAD") system, a process which is known in the art. The first portion 30 of the particulate material layer and the fluid harden to form an essentially solid circular layer that becomes a rigid cross-sectional portion of the final article.

In some instances, the inkjet nozzle 28 may be used to dispense two or more fluids simultaneously. In such instances, it is preferable that the fluids are mixed together before being introduced into the nozzle.

FIG. 3 is a schematic representation of another embodiment of the method, in which a first ink-jet nozzle 28 delivering a plurality of droplets of a first fluid 26 and a second ink-jet nozzle 29 delivering a second fluid 27 to a portion 30 of the layer 20 of the particulate material in a two-dimensional pattern. As in the previous embodiment, the fluids 26 and 27 are delivered, or printed, to the layer of particulate material in any predetermined two-dimensional pattern. Those of skill in the art will recognize that any number of ink-jet nozzles may be used to deliver fluid to the layer of particulate material, limited only by practical considerations. In the present embodiment, the fluids may be the same or different, depending on the material system being used, which were described previously. When different fluid materials are used, it is necessary that the ink-jet print heads are in close enough proximity to allow the fluids to mix together on the surface of the particulate material.

In some instances, it may be desirable to print very small features. The size of features that may be printed is determined, in part, by the size of the droplets dispensed from the nozzle. In general, smaller nozzles produce smaller droplets and smaller printed features. However, smaller nozzles reduce the printing speed, as the volume of fluid printed on the layer of particulate material decreases, and clogging may occur as well. Occurrences of nozzle clogging may be avoided by using larger nozzles, which dispense larger droplets. Again, the size of the nozzle and droplets may be practically limited by the acceptable amount of distortion in the final article. Preferably, the individual droplets of fluid have a volume ranging from about 5 pl to about 200 pl. Commercially available print heads are available that provide droplet sizes in three ranges, typically from about 3 pl to about 25 pl, from about 40 pl to about 100 pl and from 250 pl to about 5000 pl. Typically, the material systems and method of the present invention are capable of producing features on the order of about 75-125 µm, but smaller or larger features may be achieved by changing the droplet size.

Any loose particulate material 32 that was not exposed to the fluid remains loose and free-flowing on the movable surface. "Loose" or "free-flowing" as used herein, refers to any unhardened or unsolidified particulate material. Preferably, the loose particulate material is left in place until formation of the final article is complete. Leaving the loose particulate material in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second layer of particulate material is then applied over the first, covering both the rigid first cross-sectional portion 30, and any loose particulate material by which it is surrounded. A second application of fluid follows in any of the manners described above. Thus, the particulate material and fluid material in the newly printed layer harden, forming a second rigid cross-sectional portion added to the first rigid cross-sectional portion of the final article. The movable surface is again indexed downward.

Maximizing the amount of fluid printed to the layers ensures that fluid is available to act as a vehicle in which the reaction may take place. The fluid is capable of bonding together the particulate material in an amount that is several times the mass of a droplet of the fluid. The amount by which the individual droplets expand or migrate into the particulate material depends on many factors, including the rate at which the fluid and the particulate material react, and may also be affected by the addition of additives to either the particulate material and/or the fluid.

Figure 4:
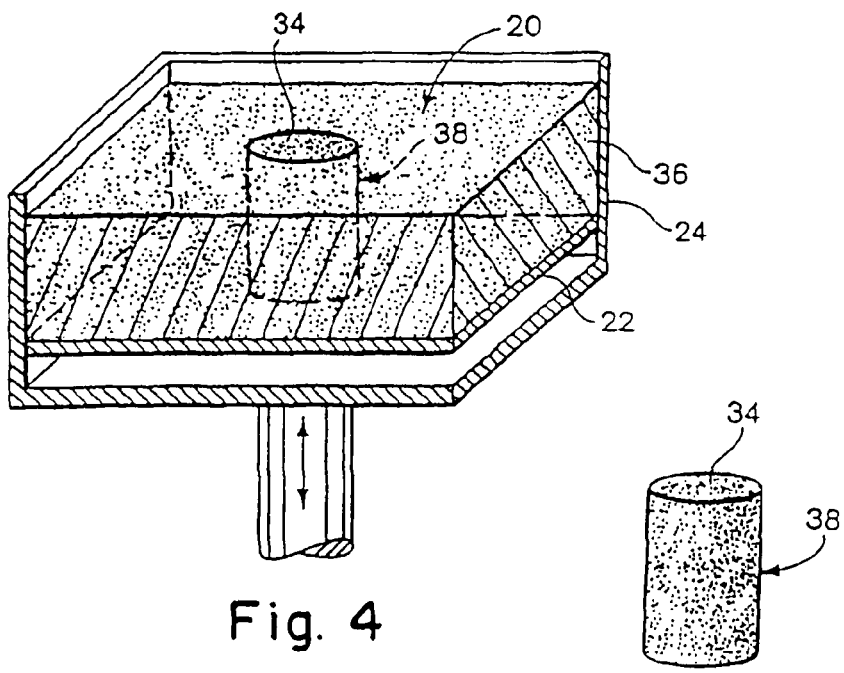
FIG. 4 illustrates schematically a view of a final article made from a series of steps illustrated in FIG. 1-2 or 1-3 enclosed in the container while it is still immersed in the loose particles.

The previous steps of applying a layer of particulate material, applying the fluid, and indexing the movable surface downward are repeated until the final article is completed. Alternatively, those skilled in this art would know how to build an article in layers upward from an immovable platform, by successively depositing, smoothing and printing a series of such layers. FIG. 4 is a schematic representation of a final cylindrical article after it has been completely formed. At the end of the process, only the top surface 34 of a final article 38 is visible in the container. The final article is preferably completely immersed in a bed 36 of loose particulate material, and is made up of a plurality of essentially evenly distributed layers.

Figure 5:
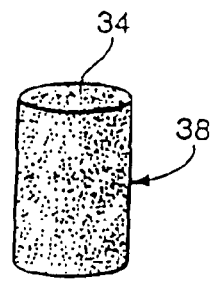
FIG. 5 illustrates a view of the final article from FIG. 4.

FIG. 5 is a schematic representation of the final cylindrical article 38 after removal of the loose particulate material, preferably by blown air or a vacuum. After removal of the loose particulate material from the final article 38, post-processing treatment may be performed, including cleaning, infiltration with stabilizing materials, painting, etc.

After the final article has been formed, any additional fluid, or free moisture, may be removed to increase the strength of the printed article. Although not required, excess moisture may be removed from the final article by drying at a temperature of at least about 125° F., generally up to a limit of around 350° F. If an adhesive is incorporated into the article, higher drying temperatures may be used, which is dependent on the adhesive used. In general, when an adhesive is used, the flexural strength of the final article increases with the amount of time it is subject to heat.

After the final article has set, and all loose surrounding powder has been removed, the article may be infiltrated with a variety of materials to improve the hardness, strength, or toughness. These finishes may fill in any pores in the part, improving the surface finish, and making it more impervious to water or solvents. Suitable hardeners include, but are not limited to, molten wax, varnish, lacquer, cyanoacrylate, polyurethane, and epoxy.

A final article formed using the material systems and methods of the present invention will include a plurality of evenly distributed layers of the mixture of the particulate material and the fluid. The layers preferably each have a thickness in the range of less than about 1000 µm, more preferably about 25 µm to about 250 µm, and more preferably still about 80 µm to about 175 µm. For layers having a thickness of less than about 125 µm, the uniformity of the layer typically varies less than about 0.001". The flexural strength of the article of the invention is dependent on, among other things, the composition of both the particulate material and the fluid, the ratio of fluid to particulate material, and the amount of additives, if any. In practice, the strength of the articles is limited only by the minimum strength required in order to handle the article without breaking. The preferred flexural strength of the final articles is dependent on the type of article that is formed, but is typically at least about 1 MPa, more preferably at least about 5 MPa, and more preferably at least about 10 MPa. Flexural strength of less than 1 MPa may be sufficient for some applications.

Example 1

Line tests were performed to determine suitable combinations of anionic starch, cationic starch, and polyelectrolyte. A particulate material was prepared to include a cationic starch and an anionic starch blended in a 1:1 mixture, by weight. A fluid mixture containing an aqueous binder and about 3% of a polyelectrolyte was prepared and dispensed onto the powder. A syringe was used to squirt the polyelectrolyte mixture onto the starch mixture. Suitable material systems are shown below in Table 1.

TABLE 1

| Cationic Starch | Anionic Starch | Polyelectrolyte | Line Test Results |
|---|---|---|---|
| Apollo 4280 | Astro Gum 3010 | PMAA | − |
|  |  | PAA | − |
|  |  | PSS | ++ |
|  |  | PDAC | − |
| Pencat 600 | Astro Gum 3010 | PMAA | − |
|  |  | PAA | − |
|  |  | PSS | ++ |
|  |  | PDAC | − |
| Apollo 4280 | Astro Gum 21 | PMAA | + |
|  |  | PAA | − |
|  |  | PSS | ++ |
|  |  | PDAC | − |
| Pencat 600 | Astro Gum 21 | PMAA | + |
|  |  | PAA | − |
|  |  | PSS | ++ |
|  |  | PDAC | − |

Those material system combinations with positive results were further tested on a three-dimensional printing system. Those material systems with negative results were further optimized.

Example 2

Line tests were performed on a material system in which the particulate material was glass beads having an aminosilane coupling agent on the exterior surface. The fluid material was an aqueous solution containing about 2% potassium sulfate and about 3% of either PMAA or PAA (as shown below in Table 2). The pH of the fluid was adjusted to about 5 by adding a 1 Molar solution of sodium hydrogen sulfate. A syringe was used to squirt the fluid mixture onto the particulate mixture.

The composition of the particulate mixture and fluid mixture are shown below in Table 2. The resulting lines were cohesive and were lifted out of the bed of glass beads without breaking.

TABLE 2

| Glass beads | Bead Diameter (μm) | Polyelectrolyte |
|---|---|---|
| Spheriglass, 2530-CP-03 | 71 | PMAA |
|  | 71 | PAA |
| Spheriglass, 2227-CP-03 | 119 | PMAA |
|  | 119 | PAA |

Example 3

Test bars were formed to evaluate the strength of a material system. ZB7™ stock binder from Z Corporation was printed onto a particulate mixture. The particulate mixture included polyanionic polystyrene sulfonate (PSS) (MW 70,000, available from Aldrich Chemicals, Milwaukee, Wis.) and a polycationic potato starch (available under the product name Unicat C3T from Kalamazoo Paper Chemicals, Kalamazoo, Mich.), and glass beads (available under the product name Spheriglass #2530(CP-03) and #2227(CP-03) from Potter Industries) or technical grade pumice (available from PTI Process Chemicals, Cary, Ill.). The glass beads were unreactive with the PSS, potato starch, and the aqueous fluid.

An electrostatic attraction between the PSS and starch was activated by the fluid, causing the materials to interact chemically to form an essentially solid article that included the glass beads or the pumice.

TABLE 3

| PSS | Unicat C3T | Glass Bead Diameter (μm) | Pumice Particle diameter (μm) |
|---|---|---|---|
| 5 | 25 | 70 |  |
| 12 | 6 | 82 |  |
| 3 | 7 | 90 |  |
| 9 | 21 | 70 |  |
| 15 | 35 |  | 50 |
| 15 | 35 |  | 50 |
| 35 | 15 |  | 50 |

Test bars made of the materials shown above in Table 3 had a strength ranging from 1-2 MPa.

Example 4

This is an example of a two-component materials system in which a reactant in the liquid combines with a particulate reactant to form an adhesive. The powder used contains 45% maltodextrin, 25% cellulose fiber, 15% sucrose, and 10% Amphomer LV-71 (National Starch and Chemical, Bridgewater, N.J.), in which all powders have a preferred grain size less than 100 microns, and larger than two microns, most preferably around 20-40 microns. The Amphomer is the reactive component in the powder. The binder consists of a mixture of 82% water, 15% 2-amino-2-methyl-1-proanol (AMP), and 3% isopropyl alcohol. Amphomer is insoluble in water unless it reacts with AMP. The combination of AMP and Amphomer dissolves, bonds to the maltodextrin and cellulose, after which the Amphomer crosslinks with itself. The butylaminomethacrylate is cationic, and bonds to anionic components in the acrylates portion of the copolymer, causing the solution to form a gel. This gel stiffens the adhesive bonds with the other components, forming a solid part.

Example 5

This is an example of a two-component materials system in which a first fluid dissolves an adhesive in the powder and a second fluid solidifies the adhesive. The powder of Example 4 is used as well as one of the two binder formulas. Using a machine with at least two independent fluid channels (e.g. the Z402C™ color 3-D printer) A second binder formula consisting of 89% water, 8% acetic acid, and 3% isopropanol is printed through the second set of fluid channels. The binder with AMP is printed in a first pass, and the binder with acetic acid is printed in a second pass. After the first pass, Amphomer dissolves and migrates to bonds between grains of filler. This proceeds until the second pass, when the acid neutralizes the AMP from the first pass, rendering the Amphomer insoluble, and accelerating the solidification.

Example 6

This is an example of a two-component materials system in which a first particulate reactant comprises a salt and the second particulate reactant is a polyelectrolyte. A mixture of a powder is used containing 90% limestone powder and 10% sodium polystyrene sulfonate (Versa TL-70 from Alco Chemical Co.). The grain size of the limestone is preferably less than 50 microns and greater than 2 microns, most preferably around 20 microns. The grain size of the polymer is preferably less than 100 microns, and most preferably between 10 microns and 40 microns. This material is activated with a standard binder solution (ZCorp "ZB7™") that performs as a solvent for the polymer, dissolving it and bringing it into contact with the limestone. The anionic sulfonate polymer is ionically bonded to the calcium cations in the limestone, resulting in a material with a flexural strength in excess of 14 megapascals (MPa).

Example 7

This is an example of a two-component materials system in which two particulate reactants dissolve in the fluid, one reactant being an adhesive and the other crosslinking the adhesive. In a preferred embodiment following this claim, a powder consisting of a mixture of 22% sucrose, 25% cellulose fiber, 52% maltodextrin, 1% polyethylene oxide (molecular weight 5,000,000) and 2% polyvinyl alcohol (PVA), was built using a standard fluid binder (ZCorp ZB7™) and found to have approximately 20% higher flexural strength than the equivalent mixture with maltodextrin replacing the PVA.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

What is claimed is:

1. A material system for three dimensional printing comprising:
    a dry particulate material comprising an adhesive;
    a first fluid suitable for dissolving the adhesive, the first fluid comprising a fluid selected from the group consisting of isobutene, alkenes, alkyl-vinyl ethers, vinylacetals, dienes, n-vinyl carbazole, beta-pinene, oxiranes, n-substituted aziridines, lactams, and oxazolines; and
    a second fluid comprising a solidification agent that is a cationic initiator selected from the group consisting of sulfuric acid, perchloric acid, fluorosulfonic acid, trifluoromethyl sulfonic acid, trifluoroacetic acid, tin tetrachloride, aluminum trichloride, and boron trifluoride,
    wherein the dry particulate material is suitable for use in three dimensional printing to form an article comprised of a plurality of layers, and upon application of the first and second fluids to a first region of a layer of the dry particulate material, the first fluid dissolves the adhesive, and a reaction between the first fluid and the solidification agent causes a solidified material to form in the first region.

2. The material system of claim 1 wherein the adhesive comprises an inert polymer selected from the group consisting of poly(methyl methacrylate), polystyrene, polyamide, polyester, a latex, polyethylene, polypropylene, polyurethane, polyvinyl chloride, polyvinyl acetate, cross-linked polyvinyl pyrrolidone, hydrophilic polyurethane, poly(ethylene terephthalate), thermoplastic urethane, styrene-acrylonitrile copolymer, thermoplastic polyolefin, an epoxy-based polymer, polyether, polyamine, a polyacid, a polycarbonate, a vinyl polymer, an aromatic polyamide, a diene polymer, poly(phenylene oxide), polysiloxane, polynorbornene, polyisoprene, a polyphenylene ether, styrene-butadiene block copolymer, acrylonitrile-butadiene-styrene, high impact polystyrene, and copolymers thereof.

3. The material system of claim 1 wherein the first fluid comprises at least one of a pure fluid and a solution.

* * * * *